March 21, 1950 S. R. GIACOLETTO 2,501,043
RAT TRAP
Filed Sept. 2, 1943 3 Sheets-Sheet 1

Inventor
S. R. Giacoletto
By L. F. Randolph
Attorney

March 21, 1950 S. R. GIACOLETTO 2,501,043
RAT TRAP
Filed Sept. 2, 1943 3 Sheets-Sheet 2
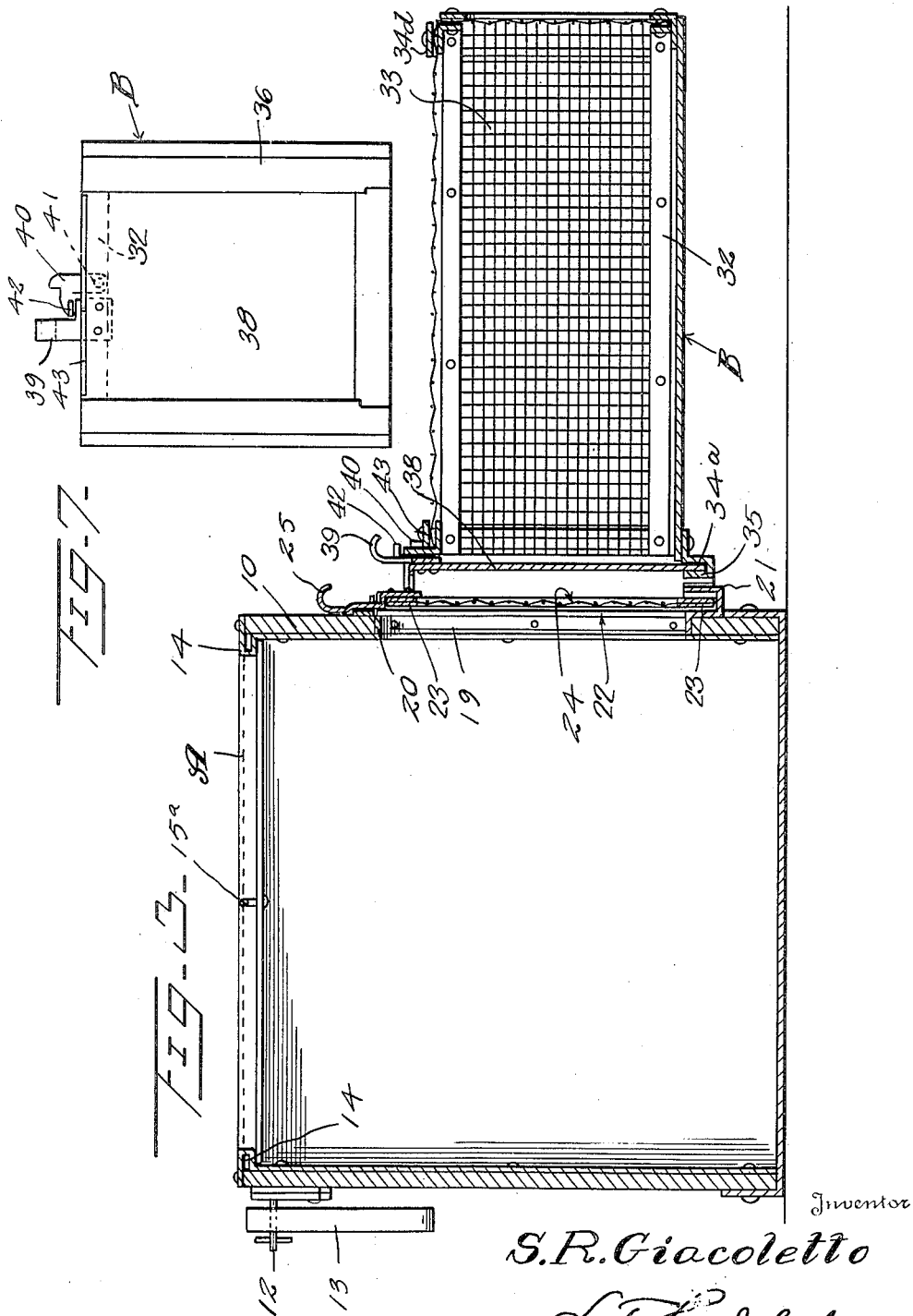
Inventor
S. R. Giacoletto
By L. F. Randolph
Attorney March 21, 1950     S. R. GIACOLETTO     2,501,043
RAT TRAP
Filed Sept. 2, 1943     3 Sheets-Sheet 3
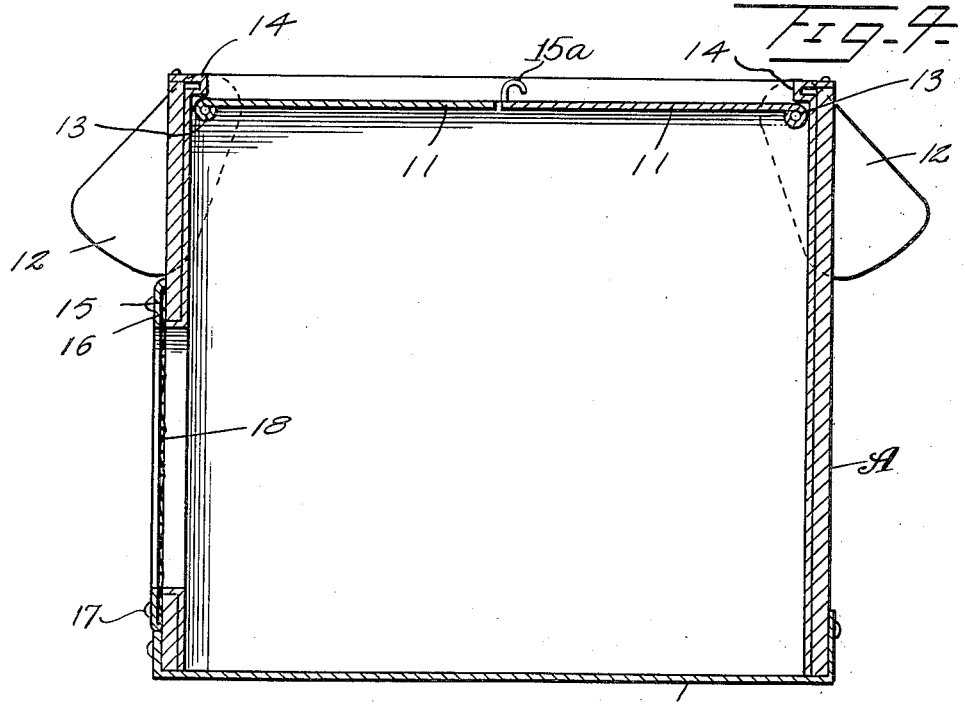
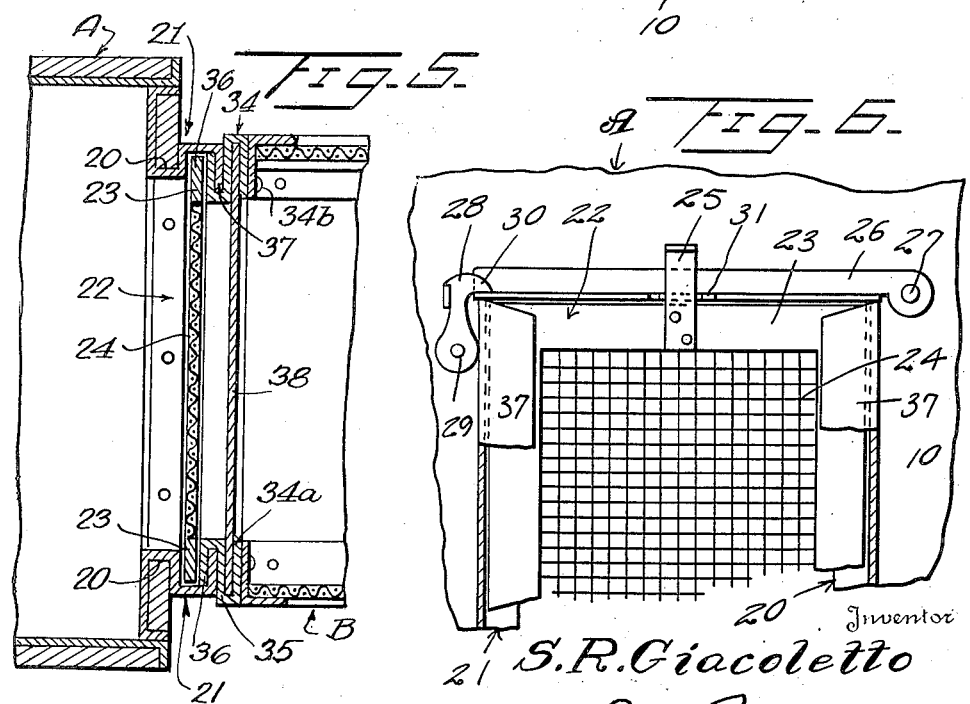
Inventor
S. R. Giacoletto
By L. F. Randolph
Attorney Patented Mar. 21, 1950

2,501,043

UNITED STATES PATENT OFFICE 2,501,043

RATTRAP

Savino R. Giacoletto, San Francisco, Calif.

Application September 2, 1943, Serial No. 500,982

2 Claims. (Cl. 43—69)

This invention relates to a trap for catching animals of various kinds alive, as for instance rodents and particularly rats, although no limitation is to be inferred.

It is especially aimed to provide such a trap in which the captive animal may be removed readily for disposal, without removing the trap from its set location, and without requiring contact with the body of the rat, and with the maintenance of relatively clean and sanitary conditions.

It further is aimed to provide such a structure in which there is a removable cage arranged for attachment to and in communication with the trap, in connection with novel connection means, and closure means to enable the trap and the cage to be closed, and all closures securely fastened.

The more specific objects and advantages will become apparent from a consideration of the description following taken in connection with accompanying drawings illustrating an operative embodiment.

In said drawings:

Figure 3 is a longitudinal vertical section taken on the line 3—3 of Figure 1;

Figure 4 is a cross-sectional view taken on the line 4—4 of Figure 1;

Figure 5 is a cross-section taken on the line 5—5 of Figure 2;

Figure 6 is a view partly in elevation and partly in section, fragmentarily showing the exit opening of the trap and the closure therefor; and Figure 7 is an inner end elevation of the cage showing the vertical connecting flanges.

Figure 1:
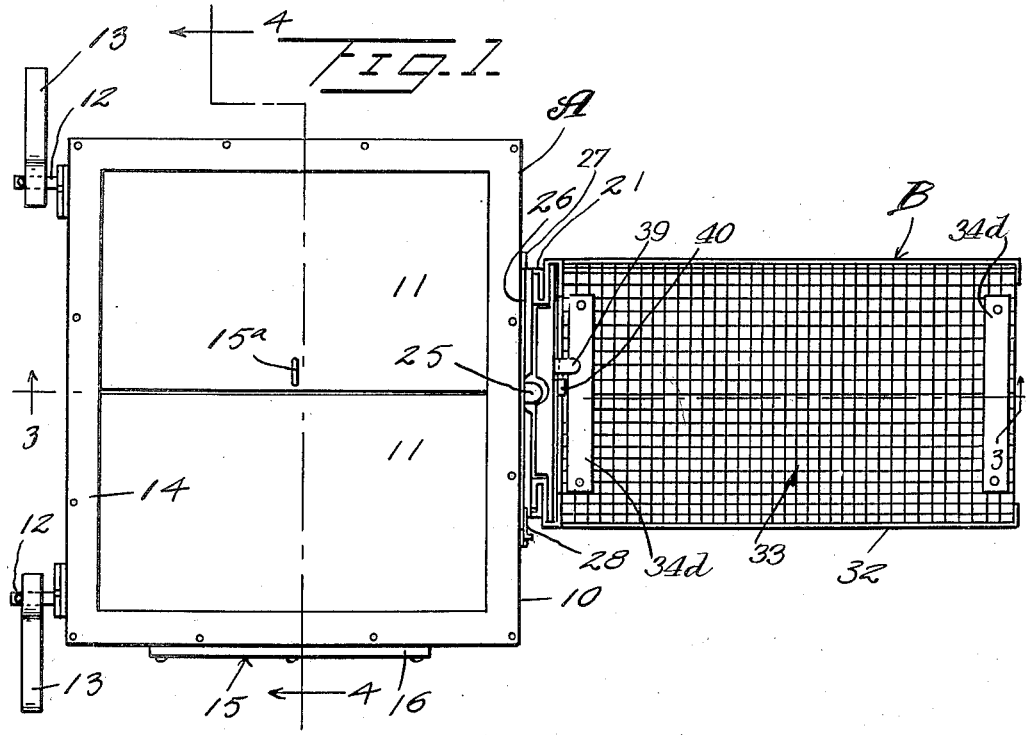
Figure 1 is a top or plan view.
Figure 2:
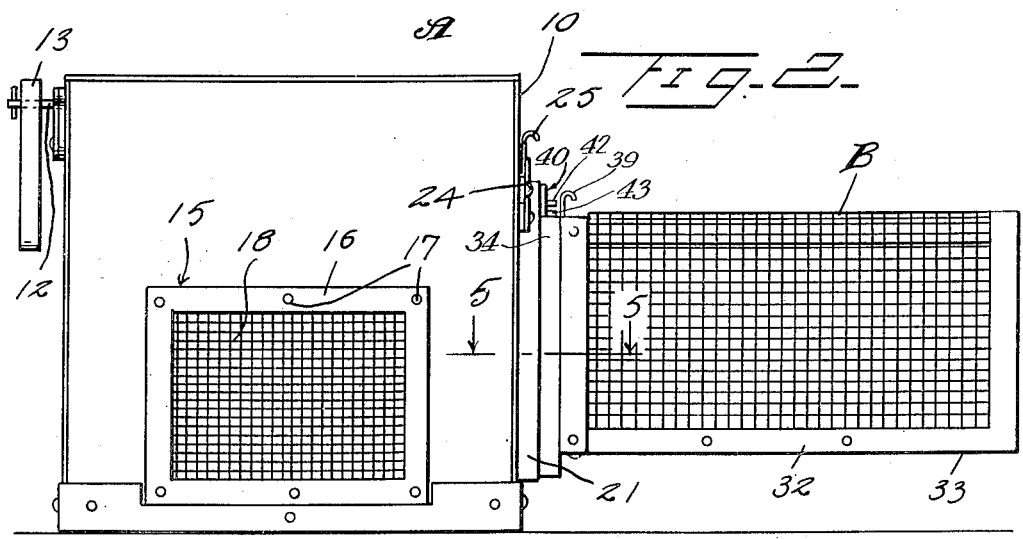
Figure 2 is a side elevation.

Referring specifically to the drawings wherein like reference characters designate like or similar parts throughout the different views, the invention primarily includes a trap generally designated A and a cage generally designated B, the same being capable of attachment and detachment, and each capable of independent closure, as hereinafter will be specifically explained.

Reverting to said trap A, it may be of any suitable construction, being made of galvanized iron or other metal or composite as preferred, and having a receptacle as at 10 which may be rectangular or square in plan, although it may be manufactured in any desired shape or size. A pair of trap doors 11 normally close the top of the trap, being carried by and pivotally mounted by rods 13 suitably journaled in walls of the receptacle. On the rods 13 suitable weights 12 are attached and they urge the doors 11 to uppermost or closed position wherein they underlap or abut an inwardly extending ledge or rim 14 arranged continuous about the open top. A relatively small low hook or any equivalent may be provided at 15a on one of the doors 11 to facilitate the attachment of bait thereto. An animal in traversing the receptacle 10 in quest of the bait anchored by the hook 15a will tread upon one or more of the doors 11, overbalancing them, and fall into the interior of the trap, thus being captured. The weights 12 will serve to close the doors 11 immediately and automatically after the animal has fallen into the trap.

At one side of the receptacle 10 a suitable window may be provided as at 15, comprising for instance a frame 16 riveted at 17 to a wall of the trap, with its space covered by wire mesh fabric 18 or any equivalent.

An outlet opening 19 is provided through which captured animals are adapted to be removed. Fastened to the receptacle 10 at such opening 19, as best shown in Figures 3 and 5, is a metallic or other frame at 20 having a portion which lines the opening and an outer portion 21 of U- or channel-shape in cross section, and which portion 21 extends across the bottom as shown in Figure 3, and up both sides as shown in Figure 5, but not across the top.

A closure generally designated 22 is slidably applicable to and adapted to be retained in the channel 21. This closure is in closed position in the set condition of the trap. This closure may be of any suitable construction, for instance having a marginal frame of metal or other material 23 with its space or opening covered by open mesh wire or gauze material as at 24. To facilitate handling of the closure a hook or finger piece 25 is provided thereon. Also, the closure 22 may be fastened securely in place against upward removal, since a latch bar generally of angle-shape in cross-section is provided at 26, being pivoted at 27 to a wall of the trap and adapted to extend across the upper end of the channel portion 21, in the path of removal of the closure 22. The latch bar 26 is adapted to be fastened in such position, as shown in Figure 6, through the medium of an auxiliary latch element 28 pivoted at 29 to a wall of the receptacle 10 and having a hook at 30 adapted for movement into and from overlapping relation with the bar latch 26 to secure and release it. The bar latch 26 at 31 is cut away to provide clearance in order to avoid interference with the handle or finger piece 25.

The previously referred to cage B is used to remove captives from the receptacle 10 for disposal. As previously stated, the cage B is not in position in the set condition of the trap. This cage may be of any desired size or shape, but preferably consists of a metallic frame 32 covered on all four sides but at one end only by open mesh or grating material 33 of metal or otherwise as preferred. As a result, one end of the cage B remains open. The cage is provided with reinforcing plates 34d.

At the latter open end a connecting frame 34 is riveted by means of rivets 34b or otherwise fastened to the frame 32 and the material 33. This connecting frame 34, as best shown in Figure 5, is of S shape in cross-section so that a web 35 and outer flange 36 thereof may slide into detachable engagement with an outer flange 37 of the frame or channel 21. It is to be noted that the space or groove of the frame or channel 21 is of a width just enough to accommodate at the same time or jointly the closure 22 and the flange 36, to permit removal of the closure 22 while the cage B is thus attached by the flanges 36 which are in such groove or channel.

The open end of the cage B is adapted to be closed by any suitable closure, for instance that of composite sheet metal form disclosed at 38 in Figure 7 in particular. This closure 38 is slidably applicable and removable between the web 35 and the flange 34a, and it has a handle, hook, or finger piece 39 thereon to facilitate its removal. Coacting with the closure 38 to secure it against accidental sliding or displacement, is a latch at 40 pivoted at 41 to a part of the cage B, for instance the frame 32. When the latch 40 is in latched position a lug 42 thereon overlaps a lug 43 on the closure, thus preventing lifting or sliding of the closure.

From the foregoing it will be clear that when the trap is set the closure 22 is in place but the cage B is detached. Upon capturing an animal the cage is attached as described. With the closures 22 and 38 raised or opened the animal will rush into cage B, following which the closure 38 is closed and latched by the element 40, and the cage B thereupon detached from trap A, and the captive animal disposed of in any desired manner, the closure 22 thereupon being again closed or restored to normal position.

It is to be realized that the closures 22 and 38 may be detached completely from the receptacle A and cage B respectively if desired, or they may be arranged so as to be adapted for opening and closing without detachment from their respective elements or parts.

Various changes may be resorted to provided that they fall within the spirit and scope of the invention.

I claim as my invention:

1. A trap of the character described comprising a captive chamber and a cage, said chamber and cage having openings affording intercommunication therebetween, a displaceable closure for inter-position between the chamber and cage, and means for detachably connecting the cage to the chamber at said closure, said detachable connection consisting of flanged interlapping formations on said chamber and cage at the said openings, one of said flanged formations being of sufficient width to slidably receive said closure, the formation on the chamber being of U-shape and channeled at its inner side, the formation on the cage being of U-shape and channeled at its outer side to define an external flange for sliding disposition in the channel of the chamber formation.

2. A trap of the character described comprising a captive chamber and a cage, said chamber and cage having openings affording intercommunication therebetween, a displaceable closure for inter-position between the chamber and cage, means for detachably connecting the cage to the chamber at said closure, said detachable connection consisting of flanged interlapping formations on said chamber and cage at the said openings, one of said flanged formations being of sufficient width to slidably receive said closure, the formation on the chamber being of U-shape and channeled at its inner side, the formation on the cage being of U-shape and channeled at its outer side to define an external flange for sliding disposition in the channel on the chamber formation, said formation on the cage being further constructed to define an internal channel defining a guideway, and a second closure for disposition in said guideway.

SAVINO R. GIACOLETTO.

REFERENCES CITED

The following references are of record in the file of this patent:

UNITED STATES PATENTS

| Number | Name | Date |
|---|---|---|
| 980,266 | Hubenbecker | Jan. 3, 1911 |
| 1,345,716 | Sudul | July 6, 1920 |
| 1,713,167 | Bushman | May 14, 1929 |
| 1,860,507 | Lang | May 31, 1932 |
| 2,115,219 | Skidelsky et al. | Apr. 26, 1938 |